United States Patent
Richter et al.

(10) Patent No.: US 6,758,288 B2
(45) Date of Patent: Jul. 6, 2004

(54) ROTARY-PERCUSSION ELECTRICAL TOOL

(75) Inventors: Martin Richter, Freising (DE); Konrad Artmann, Wörthsee (DE); Hans-Werner Bongers-Ambrosius, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/208,546

(22) Filed: Jul. 29, 2002

(65) Prior Publication Data
US 2003/0019644 A1 Jan. 30, 2003

(30) Foreign Application Priority Data
Jul. 30, 2001 (DE) .......................................... 101 37 159

(51) Int. Cl.⁷ ................................................. E21B 4/04
(52) U.S. Cl. ....................... 173/217; 173/117; 173/171; 310/54; 310/88
(58) Field of Search .......................... 173/217, DIG. 2, 173/171, 64, 65, 73, 199, 117; 310/50, 52–66, 88; 388/937; 175/17, 293

(56) References Cited

U.S. PATENT DOCUMENTS

| 1,362,049 A | * | 12/1920 | Starker | 310/88 |
|---|---|---|---|---|
| 3,325,659 A | * | 6/1967 | Douglas | 310/50 |
| 3,335,324 A | | 8/1967 | Buckeridge | |
| 4,110,643 A | * | 8/1978 | Muller | 310/54 |
| 4,370,906 A | | 2/1983 | Gurries | |
| 4,728,840 A | * | 3/1988 | Newhouse | 310/113 |
| 6,123,158 A | | 9/2000 | Steffen | |
| 6,220,046 B1 | | 4/2001 | Kristen | |

FOREIGN PATENT DOCUMENTS

| DE | 3417228 | | 11/1985 |
|---|---|---|---|
| DE | 3420393 | | 12/1985 |
| DE | 4330520 | * | 9/1996 |
| DE | 9532976 | | 3/1997 |
| DE | 9626213 | | 9/1998 |
| EP | 0107628 | | 5/1984 |
| EP | 0107629 | | 5/1984 |
| EP | 0083326 | | 8/1986 |
| EP | 0104154 | | 4/1989 |

OTHER PUBLICATIONS

U.S. patent application Publication U.S. 2002/0007956 A1, Jan. 24, 2002.
Patent Abstract of Japan No. 091455765, Jun. 17, 1997.

* cited by examiner

*Primary Examiner*—Stephen F. Gerrity
*Assistant Examiner*—Thanh Truong
(74) *Attorney, Agent, or Firm*—Sidley Austin Brown & Wood, LLP

(57) ABSTRACT

A percussion electrical tool including an electrical motor (6) located in a firedamp-protected housing (6), control electronics (4) for controlling operation of the electric motor (6); an inverted rectifier (5) connecting the control electronics (4) with the electric motor (6); an electronic module (9) located in the housing (3); an intermediate wall (7) for separating the electronic module (9) from a portion of a housing volume in which the electric motor (6) is located, connected with the inverted rectifier in a heat-conductive manner, and having a fluid-cooled cooling medium conduit.

4 Claims, 1 Drawing Sheet

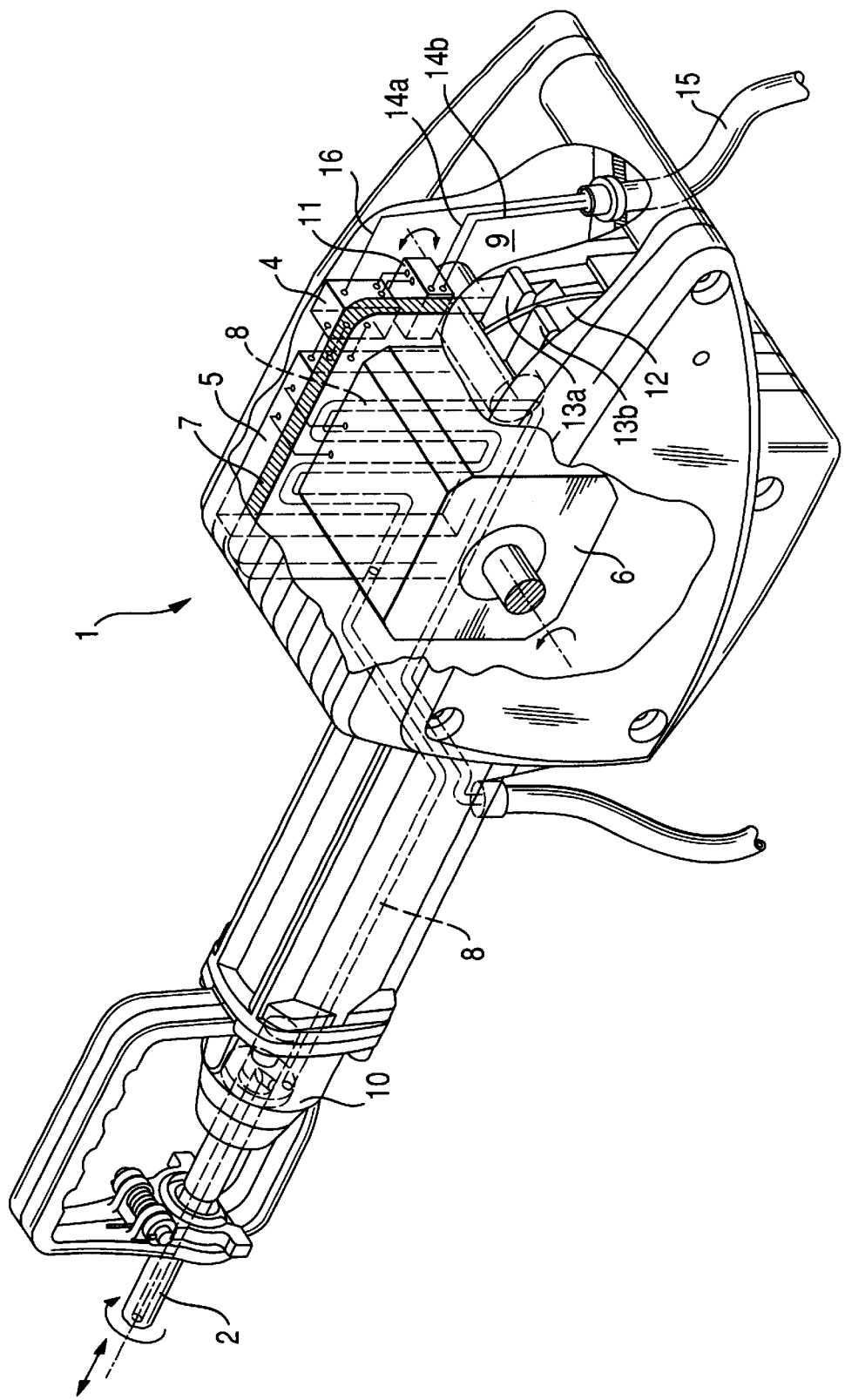

ROTARY-PERCUSSION ELECTRICAL TOOL

BACKGROUND OF THE INVENTION

1. Field of the Invention

The present invention relates to a rotary-percussion electrical tool such as a hammer drill or a chisel hammer and, in particular, to a rotary-percussion tool used in mining.

2. Description of the Prior Art

Heavy, point-supported tools, such as hammer drills, having a mass of more than 10 kg, which are usually used in an underground mining, are used for operating drills having a long drill rod and a drilling head with a diameter from 20 mm to 50 mm for forming blast bores. These tools or hammer drills are usually pneumatically driven in order to eliminate a danger of an explosion that can be caused by an electrical spark.

European Publication EP 107 629 discloses a modular hammer drill with a pneumatic percussion mechanism and a brushless, electronically commutated electric motor, with the electric motor and the inverted rectifier being cooled with air. However, with the air cooling, local temperatures often noticeably exceed ignition temperatures prevailing in mines.

German Publication DE 43 30 520 disclosed a borer with a brushless electric motor which is water-cooled, with the cooling water also used for cooling the boring tool.

German Publication DE 34 17 228 discloses an electrically commutated electric motor used in underground mining, with the switching and control elements being located in a firedamp-protected surrounding.

German Publication DE 195 46 023 discloses an electric motor, which is located in a pressure-proof and firedamp-protected housing, for use in combustible media. The housing is formed as a modular housing having a pressure-proof, closed connection chamber for feeding power and which is separated from the rest of the housing by an intermediate wall. The rotor shaft is surrounded by a firedamp-protected gap.

German Publication DE 34 20 393 discloses an electric motor located in a pressure proof and firedamp-protected housing for use in underground mining. The housing is formed as a double-wall housing having cooling medium channels which surround the stator.

An object of the present invention is to provide a portable, high-power, rotary-percussion electrical tool for use in mining.

SUMMARY OF THE INVENTION

This and other objects of the present invention, which will become apparent hereinafter, are achieved by providing a rotary-percussion tool including a firedamp-protected housing, an electric motor for driving the working tool, control electronics for controlling operation of the electric motor, an inverted rectifier connecting the control electronics with the electric motor, an electronic module located in the housing, an intermediate wall for separating the electronic module from a portion of a housing volume in which the electric motor is located, with the intermediate wall being heat-conductively connected with the inverted rectifier, and having a cooling medium conduit cooled by fluid cooling medium.

In a portable, high-power, electrical tool having an electronically commutated electric motor, electrical losses, which are produced at the electronic module side of the inverted rectifier, can lead to local temperatures above 130° C. inside the firedamp-protected housing. The cooling medium conduit, which is provided on the intermediate wall, dissipates these losses, without the outer surface of the housing being heated above 110° C.

Advantageously, the cooling medium conduit is connected with the tool chuck in which the water-cooled working tool is received. Thereby, the cooling medium is fed directly into the working tool and therethrough to the work site.

Advantageously, the cable that connects the load current circuit with the inverted rectifier, includes at least one protective conductor connected with the control electronics. Thereby, an additional a protective circuit is formed which provides for an early cut-off of the load current circuit so that in case of a mechanical break of the power feeding cable, the load current circuit is electrically cut off before a possible formation of dangerous sparks.

Advantageously, the control electronics is connected with a contactless electric motor switch such as, e.g., a Hall-switch that is actuated by a pivotable switch lever.

Advantageously, the contactless switch is actuated by two switch levers pivotable independently from each other and separated from each other by a protective member. The two levers extend into a pivot region and are actuated exclusively in combination with each other. Thereby, the actuation can be effected only with two fingers which excludes an inadvertent actuation, e.g., with a stub-shaped object.

The novel features of the present invention, which are considered as characteristic for the invention, are set forth in the appended claims. The invention itself, however, both as to is construction and its mode of operation, together with additional advantages and objects thereof, will be best understood from the following detailed description of preferred embodiment, when read with reference to the accompanying drawings.

BRIEF DESCRIPTION OF THE DRAWINGS:

The single FIGURE of the drawings shows a schematic view of a rotary-percussion electrical tool according to the present invention.

DETAILED DESCRIPTION OF THE PREFERRED EMBODIMENT

A rotary-percussion electrical tool 1 according to the present invention, which is shown in the drawing, includes a firedamp-protected housing 3 and, located in the housing 3, an electric motor 6 for driving a water-cooled working tool 2, control electronics 4 for controlling the electric motor 6, and an inverted rectifier 5 that connects the electric motor 6 with the control electronics 4. Within the housing 3, there is provided an intermediate wall 7 which is water-cooled by a cooling medium conduit 8 and which separates an electronic module 9. The intermediate wall 7 is connected, in a heat-conductive manner, with the inverted rectifier 5 that is secured on the intermediate wall 7. The cooling medium conduit 8 is connected with a chuck 10 in which the water-cooled working tool 2 is received. The control electronics 4 is connected with the electronic module 9 by a contactless motor switch 11 that is formed as a Hall-switch. The motor switch 11 is actuated by two separate, pivotable independently form each other, switch levers 13a, 13b and an arranged between the levers 13a, 13b, protection member 12. The switch levers 13a, 13 act on a shaft which is arranged in the electronic module 9 and acts on the motor switch 11. The load current circuit is interruptibly connected with the inverted rectifier 5 by two electrical conductors 14a, 14b via the motor switch 11. A feed cable 15 connects the electronic module 9 with an external power source. The cable 15 includes, in addition to the two conductors 14a, 14b for the load current circuit, a protective conductor 16 connected with the control electronic 4.

Though the present invention was shown and described with references to the preferred embodiment, such is merely illustrative of the present invention and is not to be construed as a limitation thereof, and various modifications to the present invention will be apparent to those skilled in the art. It is, therefore, not intended that the present invention be limited to the disclosed embodiment or details thereof, and the present invention includes all of variations and/or alternative embodiments with the spirit and scope of the present invention as defined by the appended claims.

What is claimed is:

1. A rotary-percussion electrical tool for driving a water-cooled working tool (2); comprising a firedamp-protected housing (3); an electric motor (6) for driving the working tool (2); control electronics (4) for controlling operation of the electric motor (6); an inverted rectifier (5) connecting the control electronics (4) with the electric motor (6); a contactless switch (11) for actuating the electric motor (6) and connected with the control electronics; an electronic module (9) located in the housing (3); an intermediate wall (7) for separating the electronic module (9) from a portion of a housing volume in which the electric motor (6) is located, the intermediate wall (7) being heat-conductively connected with the inverted rectifier (5) and having a cooling medium conduit (8) which is cooled by fluid cooling means.

2. A rotary-percussion electrical tool according to claim 1, further comprising a chuck (10) for receiving the working tool (2), and wherein the cooling medium conduit is connected with the chuck (10).

3. A rotary-percussion electrical tool according to claim 1, further comprising a cable (15) for connecting the inverted rectifier with a load current circuit, the cable (15) including a protective conductor (16) connected with the control electronics (4).

4. A rotary-percussion electrical tool according to claim 1, further comprising means for actuating the contactless switch (11) and consisting of two switch levers (13a, 13b) pivotable independently from each other and separate by a protective member (12) located therebetween.

\* \* \* \* \*